(12) United States Patent
Yesh et al.

(10) Patent No.: US 11,781,939 B2
(45) Date of Patent: Oct. 10, 2023

(54) COOLANT SYSTEM VISUAL LEAK DETECTION SYSTEMS AND METHODS

(71) Applicant: Ford Global Technologies, LLC, Dearborn, MI (US)

(72) Inventors: Kenneth Yesh, Dearborn, MI (US); Raymond C. Siciak, Ann Arbor, MI (US); Theodore John Borromeo, Detroit, MI (US); Mathew Alan Boesch, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1291 days.

(21) Appl. No.: 16/260,760

(22) Filed: Jan. 29, 2019

(65) Prior Publication Data

US 2020/0240869 A1   Jul. 30, 2020

(51) Int. Cl.
*G01M 3/38* (2006.01)
*H01M 10/613* (2014.01)
*H01M 10/625* (2014.01)
*G01M 3/00* (2006.01)
*B60H 1/00* (2006.01)
*G01M 3/18* (2006.01)
*G06F 1/20* (2006.01)

(52) U.S. Cl.
CPC .............. *G01M 3/38* (2013.01); *B60H 1/005* (2013.01); *B60H 1/00278* (2013.01); *B60H 1/00642* (2013.01); *G01M 3/002* (2013.01); *G01M 3/188* (2013.01); *G06F 1/206* (2013.01); *H01M 10/613* (2015.04); *H01M 10/625* (2015.04)

(58) Field of Classification Search
CPC ............... B60H 1/00278; B60H 1/005; B60H 1/00642; B60H 3/0023; G01M 3/002; G01M 3/188; G01M 3/38; H01M 10/613; H01M 10/625
See application file for complete search history.

(56) References Cited

U.S. PATENT DOCUMENTS

| | | | |
|---|---|---|---|
| 5,001,346 A * | 3/1991 | Barkhoudarian .. | G01N 21/3504 250/338.5 |
| 5,797,134 A * | 8/1998 | McMillan .............. | G06Q 40/08 705/400 |
| 7,528,372 B2 * | 5/2009 | Garvey, III ............. | G01J 5/025 250/330 |

(Continued)

*Primary Examiner* — Tavia Sullens
*Assistant Examiner* — Christopher C Pillow
(74) *Attorney, Agent, or Firm* — David B Kelley; Brooks Kushman P.C.

(57) ABSTRACT

An electrified vehicle powered by a traction battery includes a coolant loop arranged to convey coolant through at least a radiator, a chiller, and the traction battery to transfer heat from the battery. The vehicle also includes a refrigerant loop in fluid communication with the chiller to selectively circulate refrigerant through the chiller to provide supplemental heat transfer from coolant conveyed through the chiller. The vehicle further includes a vision system having at least one camera with a field of view including a vicinity of the radiator and a controller programmed to detect a radiator coolant leak based on image data output from the vision system. The controller is also programmed to cause a bypass of the radiator within the coolant loop to stop conveyance of coolant through the radiator in response to detecting a coolant leak.

16 Claims, 3 Drawing Sheets

(56) References Cited

U.S. PATENT DOCUMENTS

| | | | |
|---|---|---|---|
| 8,643,716 B1 | 2/2014 | Kalokitis et al. | |
| 8,989,932 B2 * | 3/2015 | Shono | |
| 9,947,975 B2 * | 4/2018 | Porras | H01M 10/617 |
| 10,156,848 B1 * | 12/2018 | Konrardy | G06Q 30/0284 |
| 2002/0049535 A1 * | 4/2002 | Rigo | G01C 21/3629 |
| | | | 455/436 |
| 2003/0158638 A1 * | 8/2003 | Yakes | G07C 5/008 |
| | | | 180/65.245 |
| 2003/0236601 A1 * | 12/2003 | McLeod | B60L 50/51 |
| | | | 701/31.4 |
| 2011/0130905 A1 * | 6/2011 | Mayer | G07C 5/008 |
| | | | 340/439 |
| 2011/0185790 A1 * | 8/2011 | Choi | G01M 3/04 |
| | | | 73/40 |
| 2013/0197745 A1 * | 8/2013 | Skelton | G01M 3/3227 |
| | | | 701/34.4 |
| 2017/0174205 A1 * | 6/2017 | Ricci | B60W 50/038 |
| 2018/0062150 A1 * | 3/2018 | Kim | H01M 10/4257 |
| 2018/0196107 A1 * | 7/2018 | Fleischer | G01R 31/3842 |
| 2018/0201152 A1 * | 7/2018 | Newman | H02J 7/35 |
| 2018/0257473 A1 * | 9/2018 | Follen | B60L 53/68 |
| 2018/0276913 A1 * | 9/2018 | Garcia | B60L 3/0046 |
| 2019/0376869 A1 * | 12/2019 | Dudar | G01M 3/16 |

\* cited by examiner

COOLANT SYSTEM VISUAL LEAK DETECTION SYSTEMS AND METHODS

TECHNICAL FIELD

The present disclosure relates to control strategies and algorithms for visually detecting a coolant system leak based on image data, and initiating at least one mitigating action to extend vehicle operating range in the presence of the coolant leak.

BACKGROUND

Electrified vehicles such as hybrid powertrain vehicles operate to help reduce fuel consumption and emissions in automobiles and other vehicles. Such electrified vehicles may include a traction motor powered by a traction battery. Traction batteries generate heat under load and may benefit from a thermal-management system to dissipate heat and thermally regulate the temperature of the battery cells. Heat generating components such as the traction battery, as well as electric motors, combustion engines, and computing electronics may be liquid cooled. Failure of a liquid circulation portion of a cooling system can result in coolant leakage, which may be visually observed by the release of steam from around the hood of a vehicle or other locations. However, in the case of autonomous vehicles, passengers are more free to undergo a wide range of desired endeavors, and thus may be less likely to actively visually monitor the external status of the vehicle.

SUMMARY

An electrified vehicle powered by a traction battery includes a coolant loop arranged to convey coolant through at least a radiator, a chiller, and the traction battery to transfer heat from the battery. The vehicle also includes a refrigerant loop in fluid communication with the chiller to selectively circulate refrigerant through the chiller to provide supplemental heat transfer from coolant conveyed through the chiller. The vehicle further includes a vision system having at least one camera with a field of view including a vicinity of the radiator and a controller programmed to detect a radiator coolant leak based on image data output from the vision system. The controller is also programmed to cause a bypass of the radiator within the coolant loop to stop conveyance of coolant through the radiator in response to detecting a coolant leak.

A vehicle includes a refrigerant system including a chiller through which refrigerant is circulated. The vehicle also includes a coolant system including a coolant loop arranged to circulate coolant through a battery, a radiator, the chiller and a bypass valve connected to a bypass conduit. The vehicle further includes a vision system to capture image data having the radiator in a field of view and a controller programmed to, in response to image data indicative of a radiator coolant leak, activate the bypass valve to prevent coolant circulation through the radiator.

A vehicle includes a refrigerant system including a chiller through which refrigerant is circulated. The vehicle also includes a coolant system including a coolant loop arranged to circulate coolant through a battery, a radiator, the chiller and a bypass valve connected to a bypass conduit. The vehicle further includes a vision system to capture image data including the radiator within a field of view and a controller programmed to, in response to image data indicative of a radiator leak, transmit the image data to a remote operator.

DETAILED DESCRIPTION

Figure 1:
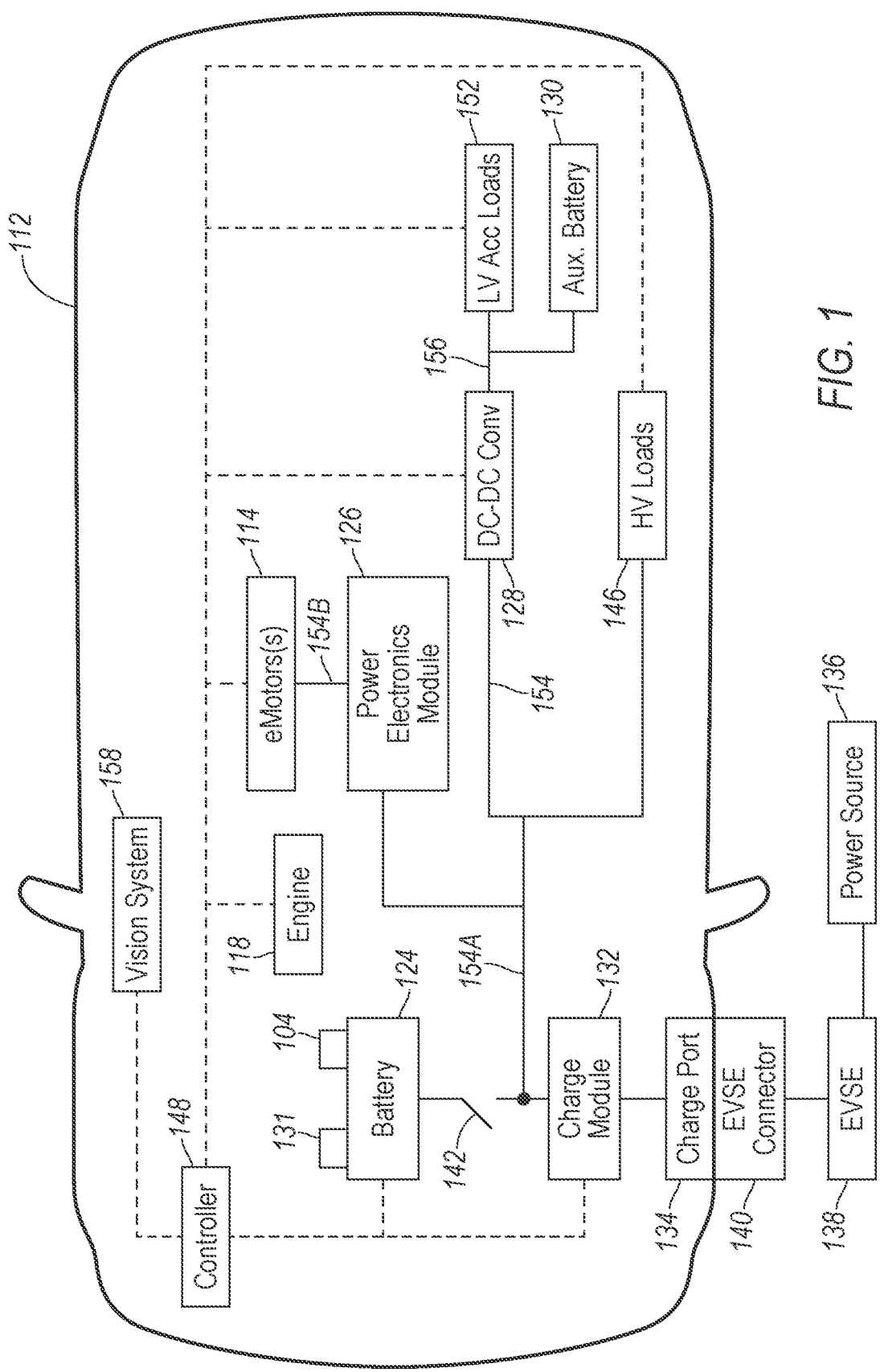
FIG. 1 is a schematic diagram of an example electrified vehicle.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Electrified vehicles having a traction battery may use the coolant loop to assist in thermally regulating the traction battery. Certain vehicle operating conditions can lead to hot coolant leakage, such as an overheating condition. Also, vehicle collisions, even those that are minor, can cause front end damage to the radiator. Leakage of hot coolant at or around the radiator may cause the release of steam near the hood of the vehicle. In the case of a human-driven vehicle the release of steam can alert the driver that cooling system service is required. An autonomous vehicle, however, may not have a driver actively watching the vehicle front end to recognize the release of steam due to a radiator leak.

In the case of a radiator at low temperature that becomes damaged or is leaking, it is difficult to immediately detect this failure. Cooling system performance is no immediately degraded and imminent failure may not be directly detected. The failure is however, ultimately detected when a cooled load begins to overheat. Actions such as hot load shed (e.g., derating the motor or battery power) can lead to a reduction in performance but keep the car operating. In more severe cases, once a sufficient amount of radiator fluid has been lost the overheated load leads to a vehicle shutdown and potential component damage.

An electrified vehicle equipped with at autonomous driving functionality can benefit from using the vision system to detect steam emitted around the hood. At the same time the electrified propulsion component may not undergo a performance degradation due to a radiator coolant leak. Aspects of the present disclosure will detect and then bypass a radiator leak, while using a chiller to provide supplemental cooling for electrified propulsion system components. As a result, the cooled subsystems necessary for driving such as a traction battery and autonomous vehicle computing hardware receive sufficient cooling from the chiller to operate normally, and the vehicle can continue some degree of limited operation.

Systems and algorithms of the present disclosure may avoid cost increases related to dedicated coolant system monitoring hardware since the optical detection hardware is already standard equipment as part of a vision system of an autonomous vehicle. Systems and algorithms of the present disclosure may also avoid need for immediate service upon detecting a leak at or near the radiator. Various levels of mitigating response actions may allow the vehicle to continue operating to drive to a convenient place to stop. According to some examples, an autonomous vehicle may be able to continue its full day's operation without interruption to the revenue stream. In other examples, a human-driven vehicle equipped with driver assist features may be able to save a customer time and money by preemptively routing the vehicle to a service destination instead of getting towed.

FIG. 1 depicts a hybrid-electric vehicle (HEV) 112. The HEV 112 includes an electrified propulsion system having one or more electric machines 114 mechanically coupled to a hybrid transmission (not shown). The electric machines 114 may be capable of operating as a motor or a generator. In addition, the hybrid transmission is mechanically coupled to an internal combustion engine 118 (i.e., ICE). The electric machines 114 are arranged to provide propulsion torque as well as deceleration torque capability either while the engine 118 is operated or turned off. The electric machines 114 are capable of operating as generators to provide fuel economy benefits by recovering energy that would normally be lost as heat in a friction braking system. The electric machines 114 may additionally impart a reaction torque against the engine output torque to generate electricity for recharging a traction battery the while the vehicle is operating. The electric machines 114 may further reduce vehicle emissions by allowing the engine 118 to operate near the most efficient speed and torque ranges. When the engine 118 is off, the HEV 112 may be operated in an electric-only drive mode using the electric machines 114 as the sole source of propulsion. The hybrid transmission is also mechanically coupled to road wheels to output torque from the electric machines 114 and/or combustion engine 118.

A traction battery or battery pack 124 (a.k.a. battery, battery assembly) stores energy that can be used to power the electric machines 114. The battery pack 124 typically provides a high-voltage direct current (DC) output from one or more battery cell arrays, sometimes referred to as battery cell stacks, within the traction battery 124. Each battery cell array may include one or more battery cells. The battery cells, such as a prismatic, pouch, cylindrical, or other types of cells, are used to convert stored chemical energy to electrical energy. The cells may include a housing, a positive electrode (cathode) and a negative electrode (anode). An electrolyte allows ions to move between an anode and cathode during discharge, and then return during recharge. Terminals may allow current to flow out of the cell for use by the vehicle. Different battery pack configurations may be available to address individual vehicle variables including packaging constraints and power requirements. Discussed in more detail below, the battery cells may be thermally regulated by a thermal-management system. Examples of thermal-management systems include air cooling systems, liquid cooling systems and a combination of air and liquid systems.

One or more contactors 142 may selectively isolate the traction battery 124 from a DC high-voltage bus 154A when opened and couple the traction battery 124 to the DC high-voltage bus 154A when closed. The traction battery 124 is electrically coupled to one or more power electronics modules 126 via the DC high-voltage bus 154A. The power electronics module 126 is also electrically coupled to the electric machines 114 and provides the ability to bi-directionally transfer energy between AC high-voltage bus 154B and the electric machines 114. According to some examples, the traction battery 124 may provide a DC current while the electric machines 114 operate using a three-phase alternating current (AC). The power electronics module 126 may convert the DC current to a three-phase AC current to operate the electric machines 114. In a regenerative mode, the power electronics module 126 may convert the three-phase AC current output from the electric machines 114 acting as generators to DC current compatible with the traction battery 124. The description herein is equally applicable to an all-electric vehicle without a combustion engine.

In addition to providing energy for propulsion, the traction battery 124 may provide energy for other vehicle electrical systems. The vehicle 112 may include a DC/DC converter module 128 that is electrically coupled to the high-voltage bus 154. The DC/DC converter module 128 may be electrically coupled to a low-voltage bus 156. The DC/DC converter module 128 may convert the high-voltage DC output of the traction battery 124 to a low-voltage DC supply that is compatible with low-voltage vehicle loads (a.k.a. low-voltage loads, LV Accessory (Acc) load) 152. The low-voltage bus 156 may be electrically coupled to an auxiliary battery 130 (e.g., a 12-volt battery). The low-voltage loads 152 may be electrically coupled to the low-voltage bus 156. The low-voltage loads 152 may include various controllers within the vehicle 112.

The traction battery 124 of vehicle 112 may be recharged by an off-board power source 136. The off-board power source 136 may be a connection to an electrical outlet. The external power source 136 may be electrically coupled to a charger or another type of electric vehicle supply equipment (EVSE) 138. The off-board power source 136 may also be an electrical power distribution network or grid as provided by an electric utility company. The EVSE 138 provides circuitry and controls to regulate and manage the transfer of energy between the power source 136 and the vehicle 112. The off-board power source 136 may provide DC or AC electric power to the EVSE 138. The EVSE 138 includes a charge connector (a.k.a. EVSE connector) 140 for plugging into a charge port 134 of the vehicle 112. The charge port 134 may be any type of port configured to transfer power from the EVSE 138 to the vehicle 112. The charge port 134 may be electrically coupled to a charge module or on-board power conversion module 132. The power conversion module 132 conditions power supplied from the EVSE 138 to provide the proper voltage and current levels to the traction battery 124. The power conversion module 132 interfaces with the EVSE 138 to coordinate the delivery of power to the vehicle 112. The EVSE connector 140 may have pins that mate with corresponding recesses of the charge port 134. Alternatively, various components described as being electrically coupled or connected may transfer power using wireless inductive coupling or other non-contact power transfer mechanisms. The charge components including the charge port 134, power conversion module 132, power electronics module 126, and DC-DC converter module 128 may collectively be considered part of a power interface system configured to receive power from the off-board power source 136.

When the vehicle 112 is plugged in to the EVSE 138, the contactors 142 may be in a closed state so that the traction battery 124 is coupled to the high-voltage bus 154 and to the power source 136 to charge the battery. The vehicle may be in the ignition-off condition when plugged in to the EVSE 138.

The various components discussed may have one or more associated controllers to control, monitor, and coordinate the operation of the components. The controllers may communicate via a serial bus (e.g., Controller Area Network (CAN)) or via discrete conductors. In addition, a vehicle system controller 148 may be provided to coordinate the operation of the various components.

System controller 148, although represented as a single controller, may be implemented as one or more controllers. The controller 148 may monitor operating conditions of various vehicle systems. According to the example of FIG. 1, at least the electric machines 114, engine 118, traction battery 124, DC-DC converter 128, charge module 132, and high-voltage loads 146, low-voltage loads 152, and vision system 158 are in communication with the controller 148.

The controller 148 also generally includes any number of subcomponents such as microprocessors, ASICs, ICs, memory (e.g., FLASH, ROM, RAM, EPROM and/or EEPROM) and software code to co-act with one another to perform various operations. The subcomponents allow onboard processing of commands and execute any number of predetermined routines according to a desired timing or alternatively in response to one or more inputs received from vehicle systems. The processors may be coupled to non-persistent storage and/or persistent storage. In an example configuration, the non-persistent storage is RAM, and the persistent storage is flash memory. In general, persistent (non-transitory) storage can include all forms of storage that maintain data when a computer or other device is powered down. The controller 148 may also store predetermined data within the memory, such as "look up tables" that are based on calculations and/or test data. The controller communicates with other vehicle systems and sub-controllers over one or more wired or wireless vehicle connections and may use common bus protocols (e.g., CAN and LIN). Used herein, references to "a controller" refer to one or more controllers.

The traction battery 124 includes a current sensor to output a signal indicative of a magnitude and direction of current flowing into or out of the traction battery 124. The traction battery 124 also includes a voltage sensor to sense a voltage across terminals of the traction battery 124. The voltage sensor outputs a signal indicative of the voltage across the terminals of the traction battery 124. The traction battery 124 may also have one or more temperature sensors 131 such as thermistors or other types of temperature sensors. The temperature sensor 131 may be in communication with the controller 148 to provide data indicative of temperature of the battery cells.

The current sensor, voltage sensor, and temperature sensor outputs of the traction battery 124 are all provided to the controller 148. The controller 148 may be programmed to compute a state of charge (SOC) based on the signals from the current sensor and the voltage sensor of the traction battery 124. Various techniques may be utilized to compute the state of charge. For example, an ampere-hour integration may be implemented in which the current through the traction battery 124 is integrated over time. The SOC may also be estimated based on the output of the traction battery voltage sensor 104. The specific technique utilized may depend upon the chemical composition and characteristics of the particular battery.

A desired temperature operating range may also be specified for the traction battery. The temperature operating range may define upper and lower thermal limits within which the battery 124 is operated. In response to a sensed temperature approaching a thermal limit, operation of the traction battery 124 may be modified or other mitigation actions may be initiated to actively regulate temperature. According to some example configurations, the traction battery 124 as well as other vehicle components are thermally regulated with one or more thermal-management systems.

Figure 2:
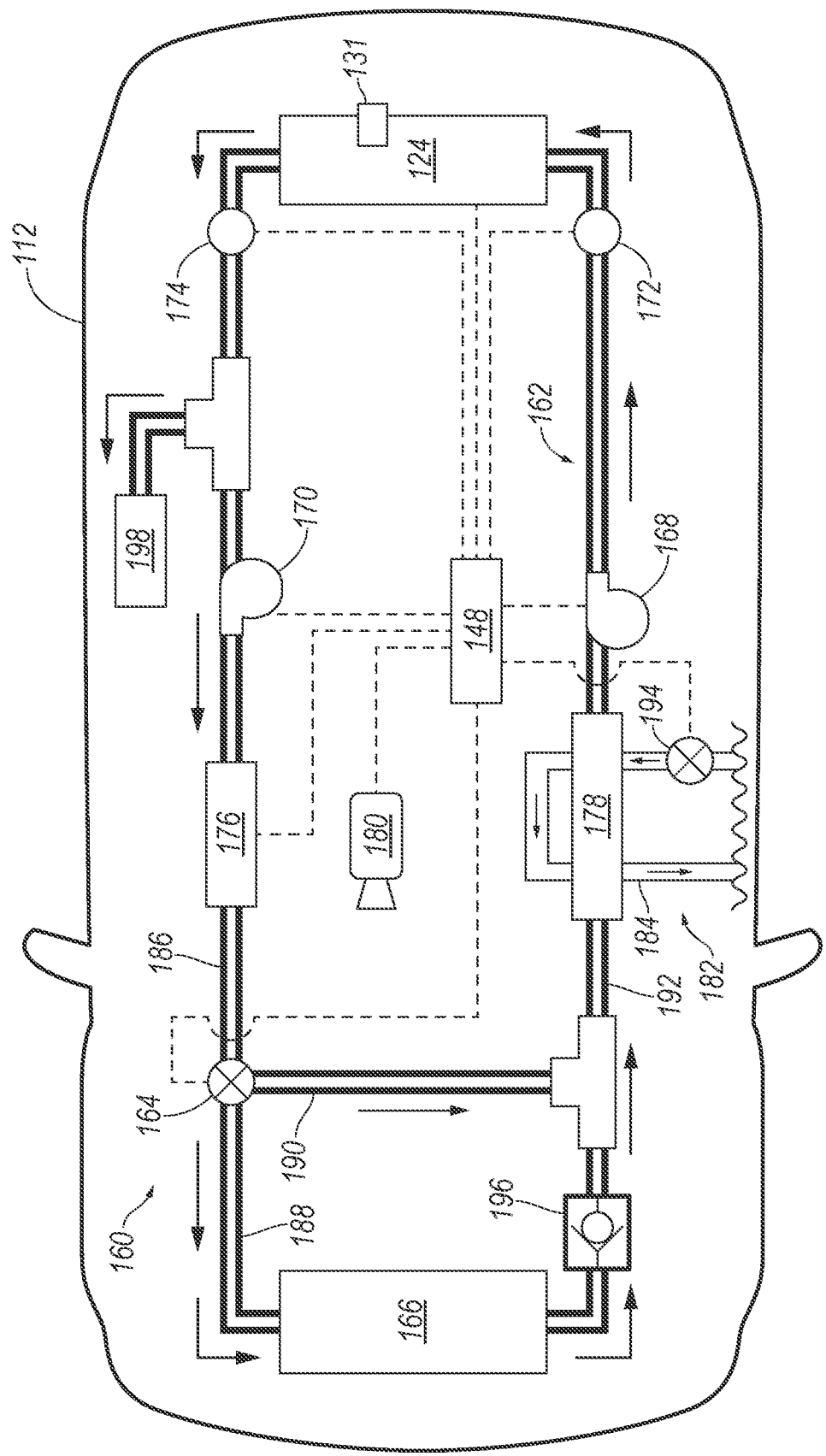
FIG. 2 is a schematic diagram of a vehicle battery thermal-management system.

Referring to FIG. 2, vehicle 112 includes a thermal management system 160. The thermal management system 160 can be employed to actively dissipate heat generated by various vehicle components, such as the battery assembly 124, powertrain components, and power electronic components.

The thermal management system 160 may use liquid cooling to dissipate heat. For example, the thermal management system 160 can selectively circulate coolant to the traction battery 124 to either cool or heat the battery assembly depending on operating conditions. The thermal management system 160 includes a coolant loop 162 to circulate coolant to the battery assembly 124. The coolant may be a conventional type of coolant mixture, such as water mixed with ethylene glycol. Other coolant types could also be circulated through the coolant loop to regulate temperature. The thermal management system 160 generally includes a bypass valve 164, radiator 166, a first pump 168, an optional second pump 170, a battery inlet coolant temperature sensor 172, a battery outlet coolant temperature sensor 174, vehicle electronics such as autonomous vehicle (AV) computer 176, the battery 124, a chiller 178, and a vision system 180. Each of the components are disposed along coolant circulation lines such that the components are in thermal communication with coolant circulated through the thermal management system 160. Components of thermal management system 160 are also in communication with the controller 148 for performance monitoring and/or thermal system control. The thermal management system 160 may also include additional or fewer components as required based on desired system performance.

In some examples, the thermal management system 160 includes a separate a refrigeration subsystem 182. The refrigeration subsystem 182 may include a vapor-compression heat pump to circulate liquid refrigerant through a chiller loop 184 to transfer thermal energy to various components of the climate-control system. According to one example, the refrigerant subsystem 182 is part of an air-conditioning (AC) system for the vehicle cabin. Utilizing the cabin AC system may be more cost effective compared to providing a dedicated refrigerant system for the traction battery 124. The chiller loop 184 may be in thermal communication with the chiller 178 to draw additional heat from the coolant loop 162. The chiller loop 184 and the coolant loop 162 may operate in tandem or independently of each other depending upon the battery cooling requirements, the ambient-air temperature, and other factors. In alternative embodiments, a refrigerant loop dedicated to battery cooling may be provided independently from the cabin AC system.

With continued reference to FIG. 2, high heat-producing loads are generated for example, by the traction battery 124 and the AV computer 176. These components are located along the cooling circuit and cooled by a circulating liquid coolant mixture of water and an anti-freeze component. Coolant circulation is powered by at least one pump 168, and optionally a second pump 170 may be provided to supplement circulation. Operation of the coolant loop begins with the radiator 166 outlet from which cooled coolant flows, located at the lower left part of the schematic of FIG. 2. In this example coolant flows counterclockwise around the diagram through a battery chiller 178 that is configured to selectably operate to supplement cooling by radiator 166 and remove further heat from the coolant using a refrigeration process.

Fluid cooled by the radiator 166 proceeds through the pump 168 to the traction battery 124 where it absorbs waste heat and cools the battery. The fluid proceeds through the optional second pump 170 to a second hot load AV computer 176 where it absorbs additional waste heat and cools the computer. The increased temperature coolant proceeds back to the inlet of the radiator 166. The radiator 166 releases heat from the coolant into the airstream passing through over the radiator 166 resulting vehicle forward motion or a fan (not shown) located near the radiator 166.

The cooling system 160 selectably operates bypass valve 164 based on operating conditions to allow coolant to skip the radiator. The bypass valve 164 may be a two-way valve including an inlet connected to conduit 186, a first outlet connected to conduit 188, and a second outlet connected to the bypass conduit 190. Opening the bypass valve 164 redirects the coolant past the radiator 164 though the bypass conduit 190. The bypass valve 164 includes an electronically controllable actuator such as a solenoid or electric motor. The controller 148 is programmed to operate the bypass valve 164 in response to vehicle conditions. The bypass valve 164 may include a radiator position where the bypass valve 164 routes coolant to conduit 188, and a bypass position (or skip position) where the bypass valve 164 routes coolant to bypass conduit 190. The bypass valve 164 may be a two-position valve that routes 100% of flowing coolant to either conduit 188 or conduit 190 depending upon valve position. The bypass conduit 190 connects between conduit 186 and conduit 192 to route coolant around the radiator when the valve directs coolant to outlet 106. The cooling subsystem 160 also includes check valve 196 to prevent coolant backflow into the radiator.

The selection of bypassing the radiator 166 may be suitable when the coolant and ambient air temperature are both very cold, and it is desired to warm and circulate the coolant. In this case it may be desirable to add heat to the traction battery 124.

Additionally, activating the radiator bypass valve 164 may be suitable when the ambient air temperature is sufficiently high such that the radiator 166 would not effectively remove enough heat to lower the coolant temperature. Unlike an engine, which operates at temperatures well above ambient, it may be desirable to operate a traction battery at temperature in a range of about 15 to 30 degrees Celsius. As such, the ambient-air temperature may exceed the desired temperature of coolant passed to the battery with regularity depending upon the season and geographic location. When the temperature of ambient air exceeds the desired coolant temperature to be passed the battery, the radiator adds heat to the coolant. The bypass valve 164 allows the radiator to be skipped when the air temperature exceeds a temperature threshold to prevent the radiator 166 from adding heat to coolant loop 162. In in the case of high ambient air temperature, the chiller 178 may be activated to supplement heat removal so that the coolant temperature is still reduced as necessary.

Temperature sensor 172 is positioned near an inlet of the traction battery 124. The sensor 172 is configured to monitor the temperature of the coolant that is circulated to the traction battery 124. A second temperature sensor 174 is position near an outlet of traction battery 124 and provides an indication of the temperature rise of the coolant across the battery. As discussed above, the traction battery 124 itself also includes one more temperature sensors 131 to monitor temperatures of various battery cells (not shown).

The coolant subsystem 160 further includes a chiller loop 184 that selectable circulates refrigerant through the chiller 178. In some examples, the chiller 178 may have a plate-fin, tube-fin, or tube-and-shell configuration that facilitates the transfer of thermal energy without mixing the heat-transfer fluids of the coolant subsystem 162 and the refrigerant subsystem 182. Coolant passed along conduit 192 is in thermal communication with the chiller loop 184. Refrigerant variably passed through chiller loop 184 removes heat from the coolant flowing through conduit 192. A valve 194 controls the circulation of refrigerant through the chiller 178. The valve 194 may be a solenoid valve that is electrically controlled by the controller 148. The valve 194 may include an electronic stepper motor for increasing or decreasing the opening of the valve to vary refrigerant flow. Other types of valves could alternatively be utilized within the coolant subsystem 160. The valve 194 is configured such that it regulates refrigerant flow proportionally between 0 and 100 percent depending upon a position of the valve. By adjusting the position of valve 194, cooling efficacy of the chiller 178 can be controlled according to algorithms stored in memory of the controller 148. For example, when the temperature of the traction battery 124 exceeds a predetermined threshold and the refrigeration subsystem 182 has capacity, the valve 194 may be actuated to circulate at least some refrigerant through the chiller 178. A warm coolant exhausted from the traction battery 124 passing through conduit 192 exchanges heat with the refrigerant cycled through the chiller 178 to dissipate heat.

The cooling system 160 may be programmed to preferably cool the traction battery 124 via only the radiator 166 whenever possible, because cooling the battery with the radiator 166 may consume less energy as compared to operating the chiller 178 to cool the battery. This reduced energy consumption may increase the operating range of the vehicle. However, there are conditions such that radiator cooling alone is insufficient to cool the battery 124. For example, battery cooling via the radiator alone may be insufficient when the battery temperature and/or ambient air temperature exceeds one or more predetermined temperature thresholds of the battery and the ambient air, respectively. Additionally, radiator-based cooling may become insufficient when the electrical load (discharge or recharge) on the traction battery 124 causes the generation of more battery heat than can be dissipated by the radiator 166 alone. Thus, in several situations, the chiller 178 is operated to provide at least some of the cooling for the traction battery 124. The proportioning valve 194 is capable of routing the necessary amount refrigerant through the chiller 178 to effectuate cooling of the battery 124 in the most efficient manner while limiting the magnitude of temperature swings of discharge air in the cabin. The proportioning valve 194 may be controlled by an algorithm that minimizes the step change of the air blown into the cabin by prioritizing cabin cooling and throttling coolant flow to the chiller based on AC system capacity availability.

As described above, certain conditions can lead to leakage from the radiator 166, including overheating conditions and/or collisions. Leakage from the radiator while at high temperature may cause the release of steam from around the front end of the vehicle. Conversely, if the radiator becomes damaged or is leaking while at low temperature there are less direct indicators present to immediately detect this failure. Therefore, cooling system imminent failure may go undetected. The failure is ultimately detected once a cooled load begins to overheat. Compensatory actions such as hot load shed (e.g., derating the electric machine output or battery power) can lead to a reduction in performance but keep the car operating. In more severe cases, once a sufficient amount of radiator coolant fluid has been lost, the overheated load leads to a vehicle shutdown and it will become disabled.

An electrified vehicle can benefit from a system to detect steam emitted from the vehicle front end resulting from a radiator failure. The vehicle 112 is equipped driver assist technology (DAT) that provides for either full or partial autonomous vehicle driving. The DAT system includes functionality from the vision system 180 having optical sensors such as forward-looking cameras. In addition to standard daylight cameras, the vision system 180 may also include combinations of other types of optics-based sensing such as infrared cameras, lidar, radar, and others. The collection of sensors is used by the vision system 180 to view its surroundings for path selection, pose estimation, and overall situational awareness. Commonly, the sensors include a field of view that includes the upcoming path in front of the vehicle to facilitate decisions related to autonomous steering and braking. According to some examples, the forward-looking vision system 180 is used to detect steam leaking due to a failure of the radiator 166. The vision system 180 is used to monitor a field of view that includes the vehicle front end, and then interpret the monitored images to detect steam leaking from the hood and vehicle front end. Based on data from the vision system that is indicative of a radiator leak, one or more vehicle controllers is programmed to issue commands to minimize coolant loss and any subsequent damage to the vehicle.

Figure 3:
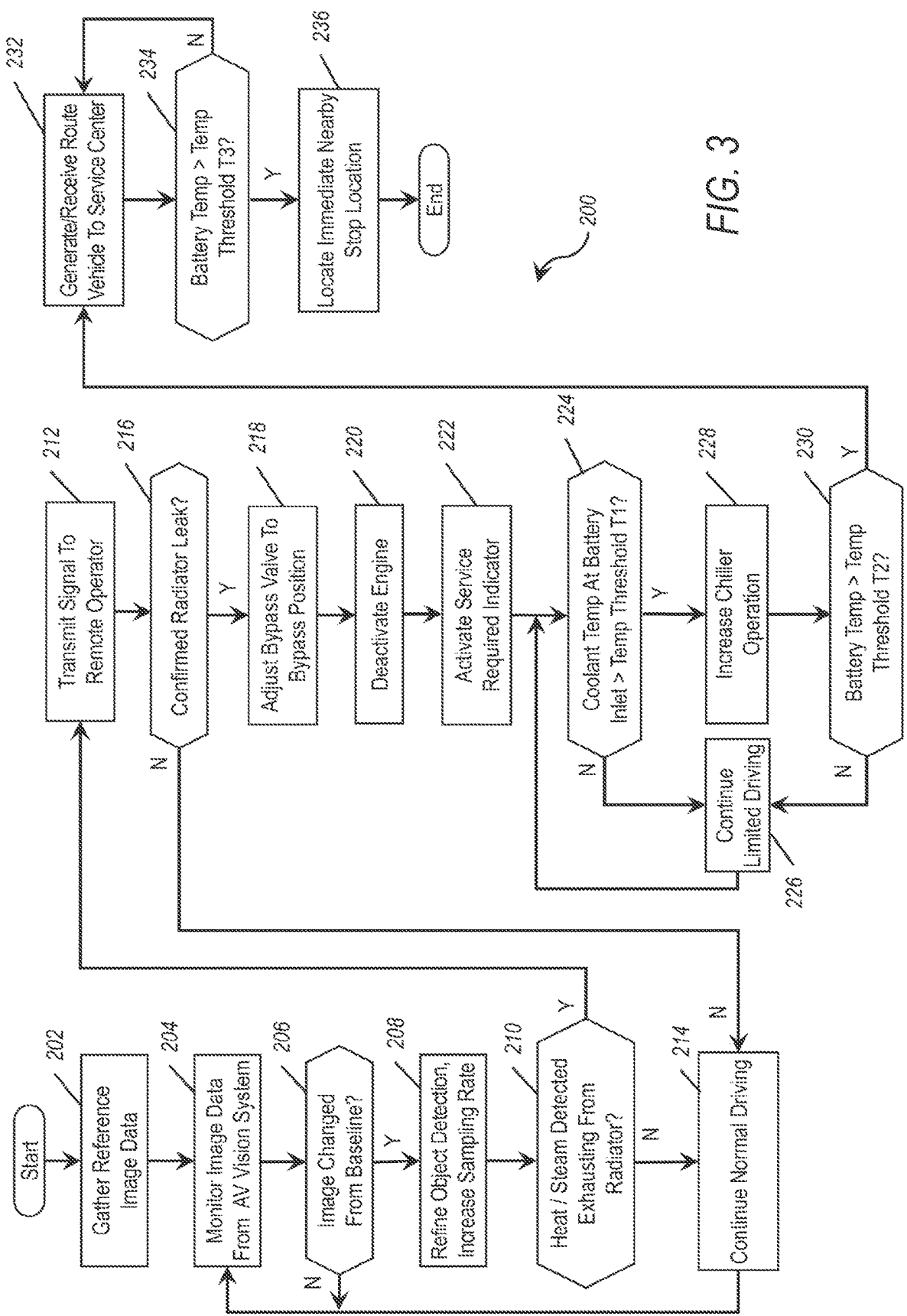
FIG. 3 is a flow chart for controlling the battery thermal-management system.

Referring to FIG. 3, method 200 represents an algorithm executed to detect a radiator leak and take mitigating actions. At step 202 the algorithm includes gathering reference image data using the vision system that includes the front end of the vehicle. For example, images of the hood, fenders, and/or headlamps are captured under normal conditions when the vehicle is cool and in the absence of radiator-emitted steam. In a specific example, reference image data is used as a baseline image and captured and stored at each vehicle startup. The reference image also includes various contextual surroundings and their effect on the appearance of the front end of the vehicle, such as weather and lighting conditions.

At step 204 the algorithm includes monitoring image data output from the vision system while the vehicle is operated. Image data may be sampled at periodic intervals while the vehicle is driving and warm. In one specific example, each image of the sampled image data includes the hood, fenders, and headlamps including various lighting conditions, and is acquired every five minutes.

At step 206 the sampled image data is compared to the reference image data to perform a rough object detection. If the sampled image does not depict sufficient change at step 206, the algorithm returns to step 204 to continue monitoring image data by sampling at relatively large time intervals.

If at step 206 the updated sampled image data is sufficiently different from the reference image data and includes an area that is indicative of a radiator steam leak (e.g., such as a cloud or puff formation), the algorithm includes performing more refined image processing analysis for object detection. In this way the vehicle may make specific determinations as to whether the radiator is leaking or another similarly-shaped object is within the field of view.

At step 208 the algorithm includes making a refined object detection assessment. In some examples, the controller is programmed to change the image sampling rate in response to a difference between sampled image data and the at least one reference image. In a more specific example, the controller increases the image sampling rate in response to a sufficient difference between sampled image data and the at least one reference image. In further examples, higher resolution images are acquired in response to a change detected at step 206. In still further examples, thermal images are acquired that include the front end within the field of view.

At step 210 more comprehensive image processing is performed to distinguish between the presence of a steam leak and other visible formations within the field of view. In some examples the vision system analyzes the images acquired at short sample intervals to determine whether steam is rising from the hood or moving off in the wind as would be characteristic of steam emitted resulting from a radiator leak. Conversely, if the detected cloud or puff formation is merely a reflection of a cloud in the car body, or passing dust, fog, rain or other weather conditions, the characteristic movement over time will differ from the movement of steam due to a radiator leak, and thus disregarded from a radiator leak diagnosis.

In further examples, the algorithm may include at step 210, a comparison back to a larger data set of reference images that includes more than merely the immediately preceding reference image from the present drive cycle. In this way, a larger set of image data indicative of normal, non-leaking, operating conditions is considered for comparison. The larger data set may help to account for a greater number of possible visible anomalies that may be distinguished from the appearance of a radiator leak thus avoiding a false diagnosis.

In still further examples, the algorithm may include at step 210, analyzing thermal image data to detect the presence of heat emission from the front end consistent with the location of the detected formation. That is, the emission of steam may lead to a localized thermal "hot spot" that would add confidence to the determination of a steam leak as distinguishable from other causes of visible formations within the field of view.

If at step 210, the refined image data is not indicative of a radiator steam leak, the algorithm includes returning to normal driving at step 212.

If at step 210, the refined image data is indicative of a radiator steam leak, the algorithm includes issuing a signal at step 212 to notify a remote operator such as a vehicle fleet controller, dispatcher, or other service personnel that a coolant leak has been detected. The remote operator may request a data connection to the vehicle vision system in order to view both live image data including the front end, as well as historical image data indicative of a radiator leak. The thermal protection algorithm may include transmitting image data from the vehicle to the remote operator for additional diagnosis. In this way the remote operator or technician may make a technical assessment confirming the presence of an actual radiator steam leak. In further examples, the operator may review other present and historical vehicle operating data (e.g., coolant temperature and/or pressure, battery temperature, radiator temperature) in order to make a diagnosis regarding the presence of a radiator leak.

If at step 210 the diagnosis includes a determination that no radiator leak is present, the remote operator may issue a reset command such that the vehicle returns to normal driving at step 214.

If at step 216 the remote operator confirms via the image or other transmitted data that the presence of steam is due to a coolant leak, the operator may send a confirmation signal to the vehicle. In turn, the vehicle may undergo one or more mitigation actions to maintain the best available vehicle operation while minimizing conditions which may cause thermal damage to the vehicle. In some alternate examples, the remote operator may select the particular mitigation action directly and continue to monitor vehicle operation. For example, and as discussed in more detail below, the vehicle may receive route instructions from the remote operator to direct the vehicle to a service destination. In further alternate examples, the vehicle controller uses onboard image processing and AI to confirm itself that the image is steam resulting from a coolant leak without needing confirmation from a remote operator. In this case, the vehicle itself may directly trigger any of a number of mitigating actions based on the severity of the coolant leak and subsequent vehicle operating conditions.

If at step 216 remote operator confirms via the image or other transmitted data that there is no radiator coolant leak, the algorithm may return to a normal driving mode at step 214.

The algorithm includes at step 218 adjusting the radiator bypass valve to stop coolant flow through the radiator and prevent further coolant loss. As discussed above, closure of the radiator bypass valve stops normal flow into the radiator inlet. The check valve located along the cooling loop near the outlet of the radiator prevents coolant backflow from entering the suspected leaking radiator through the outlet. Once the radiator bypass loop is activated, cooling heat removal functions performed by the radiator are no longer achieved. Therefore, in the case of a hybrid vehicle having an internal combustion engine, the algorithm includes deactivating the engine at step 220.

The algorithm also includes at step 222, activating a service required indicator. The vehicle may issue a service required signal to the remote dispatch indicating the need for radiator repair. Additionally, a service indicator may be provided to the driver of the vehicle informing of the need to take the vehicle in for service.

If the vehicle is able to operate without significant coolant temperature increases while cooling from the radiator is disabled, normal driving is allowed to continue without further mitigation actions. The algorithm includes at step 224, continuing to monitor coolant temperature near the inlet of the battery. If at step 224 the coolant temperature near the battery inlet is less than a first temperature threshold T1, the algorithm includes continuing limited driving at step 226 and returning to step 224 to continue to monitor coolant temperature.

If at step 224 the coolant temperature near the battery inlet exceeds the first temperature threshold T1, the algorithm includes increasing operation of the chiller at step 228. The vehicle controller includes logic to trigger chiller operation in response to coolant temperature. That is, the controller may be programmed to increase refrigerant circulation through the chiller in response to a coolant temperature exceeding the first temperature threshold. This response keeps the cooling system operational and supplies the devices necessary for autonomous driving with sufficient cooling. In some examples, this increase includes incrementally increasing a valve opening of the refrigerant loop to increase refrigerant flow through the chiller. In alternative examples, the chiller may be incremented to a maximum operation in a first operation in response to coolant temperature exceeding the first temperature threshold T1. In further examples, the chiller operation may be enabled remotely, such as by a dispatch technician monitoring the vehicle operation.

The algorithm includes at step 230 monitoring the battery temperature to maintain a desired battery temperature operating range. If at step 230 the battery temperature is less than the second temperature threshold T2, the algorithm includes returning to step 226 to continue limited driving, monitoring coolant temperature, and as required incrementally increasing chiller operation to reduce coolant temperature. Thus, the vehicle is allowed to continue driving to a convenient safe place to stop, instead of stopping when a cooled load overheats due to loss of coolant.

If the chiller is unable to sufficiently reduce coolant temperature on its own such that battery temperature continues to increase, the vehicle controller includes logic to undergo further mitigating actions to prevent damage from overheating. If at step 230 the battery temperature exceeds the second temperature threshold T2, the algorithm includes at step 232 generating a route to a service center destination. That is, the controller may be programmed to route the vehicle to a service center destination in response to the battery temperature exceeding a second temperature threshold. In some examples, the vehicle controller is programmed to generate such a route based on the expected available limited driving range caused by battery temperature increases. In other examples as discussed above, the route to a service destination may be provided by a remote operator such as a dispatch technician. Generation of the route to a service center may allow the vehicle to arrive at a service destination to receive repairs without fully losing service and causing a need for towing. Additionally, routing the vehicle to service center while still having a drivable range may prevent a passenger from becoming stranded.

Even after being routed toward a service center, if the battery temperature continues to rise during transit due to insufficient cooling, the vehicle may need to interrupt the route and pull over. If at step 234 the battery temperature is less than a third temperature threshold T3, the vehicle maintains its route toward the service center and return to step 232.

If at step 234 the battery temperature exceeds the third temperature threshold T3, the algorithm includes seeking an immediate nearby stop location to pull over at step 236. In this way, the vehicle avoids becoming inoperable while in a roadway. According to some examples, autonomous vehicle logic includes calculating the nearest location for the vehicle to pull over and park. The vehicle may also issue a service signal requesting pickup by a towing truck or other service vehicle. Alternatively, the cessation of operation may allow time for the battery to cool such that limited operation may resume so that the vehicle may arrive at the service center.

While examples discussed above describe monitoring temperature at a location near the traction battery, it should be appreciated that the responses discussed above may rely on temperature measurements taken directly at the traction battery, such as, for example, a battery cell temperature.

In further alternative examples, coolant system responses may be based on other types of coolant loop thermal variations. For example, the controller may trigger coolant system responses based on battery and/or coolant temperature changes over an extended period. That is, a threshold of rate of change of temperature may be used as opposed to direct temperature measurements. In this way, sudden changes or other temperature anomalies may trigger additional cooling regardless of absolute temperature which may avoid overall increases beyond levels which may cause vehicle damage.

In still further examples, the coolant system responses may be based on overall coolant system heat loss or gain at within the coolant circuit. That is, temperature changes at multiple locations may be used to calculate overall heat gains. Cooling or other mitigation actions may be selected depending on changes in the overall heat gain calculation. Additionally, accounting for heat gains as opposed to temperature may better account for coolant volume losses prior to activating the radiator bypass valve.

It should also be appreciated that while the present disclosure provides vision system monitoring for coolant leaks of at least the vehicle radiator, such vision monitoring and response actions may be applied to coolant system leaks at other locations of the vehicle.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. An electrified vehicle powered by a traction battery, comprising:
    a coolant loop arranged to convey coolant through at least a radiator, a chiller, and the traction battery to transfer heat from the traction battery;
    a refrigerant loop in fluid communication with the chiller to selectively circulate refrigerant through the chiller to provide supplemental heat transfer from coolant conveyed through the chiller;
    a vision system to capture image data having at least one camera with a field of view including a vicinity of the radiator; and
    a controller programmed to,
        responsive to detecting a vehicle startup, capture a baseline image of a front end of the vehicle via the vision system,
        sample, via the vision system, first images at a first sampling rate for comparison to the baseline image,
        responsive to detecting a difference between one or more of the first images and the baseline image exceeding a threshold, sample, via the vision system, second images at a second sampling rate greater than the first sampling rate,
        analyze the second images to detect an object including heat indicative of a coolant leak,
        in response to detecting the coolant leak, transmit one or more of the second images to a remote operator, and
        in response to receiving a confirmation from the remote operator, cause a bypass of the radiator within the coolant loop to stop conveyance of coolant through the radiator.

2. The electrified vehicle of claim 1 further comprising at least one temperature sensor to monitor temperature along the coolant loop, wherein the controller is further programmed to increase refrigerant circulation through the chiller in response to a coolant temperature exceeding a first temperature threshold.

3. The electrified vehicle of claim 2 wherein the controller is further programmed to route the vehicle to a service center destination in response to a battery temperature exceeding a second temperature threshold.

4. The electrified vehicle of claim 2 wherein the controller is further programmed to cause the vehicle to pull over to an immediate nearby stop location in response to a battery temperature exceeding a third temperature threshold.

5. The electrified vehicle of claim 1 wherein the image data include a live image of the radiator, the controller is further programmed responsive to receiving, from the remote operator, a request for a historical image of the radiator, transmit the historical image indicative of a coolant leak to the remote operator.

6. The electrified vehicle of claim 1, wherein the baseline image includes an appearance of vehicle hood captured under a contextual condition reflecting a weather condition in an absence of a coolant leak.

7. A vehicle comprising:
    a refrigerant system including a chiller;
    a coolant system including
        a coolant loop arranged to circulate coolant through a battery, a radiator, the chiller and a bypass valve connected to a bypass conduit;

a vision system to capture image data having the radiator in a field of view; and a controller programmed to,
- capture a baseline image of a front end of the vehicle via the vision system,
- sample, via the vision system, first images for comparison to the baseline image,
- responsive to detecting a difference between one or more of the first images and the baseline image exceeding a threshold, sample, via the vision system, second images,
- analyze the second images to detect an object including a heat or steam indicative of a coolant leak,
- wirelessly transmit a historical image indicative of a coolant leak to a remote operator, and
- in response to image data indicative of a radiator coolant leak, activate the bypass valve to prevent coolant circulation through the radiator.

8. The vehicle of claim 7 wherein the refrigerant system is configured to circulate refrigerant through the chiller, and the controller is further programmed to monitor coolant loop thermal variation and cause an increase in refrigerant circulation through the chiller in response to the coolant loop thermal variation exceeding a first threshold.

9. The vehicle of claim 8 wherein the controller is further programmed to route the vehicle to a service center destination in response to coolant loop thermal variation exceeding a second threshold.

10. The vehicle of claim 8, wherein the coolant loop thermal variation is at least one of a battery inlet coolant temperature change, a battery cell temperature change, a battery cell temperature rate of change, and a coolant loop heat gain.

11. The vehicle of claim 7 wherein the controller is further programmed to receive route instructions from the remote operator to direct the vehicle to a service destination.

12. The vehicle of claim 7, wherein the controller is further programmed to capture a new baseline image in response to each vehicle startup.

13. The vehicle of claim 7, wherein the baseline image includes an appearance of vehicle fender captured under a contextual condition reflecting a weather condition in an absence of a coolant leak.

14. A vehicle comprising:
- a refrigerant system including a chiller;
- a coolant system including a coolant loop arranged to circulate coolant through a battery, a radiator, the chiller, and a bypass valve connected to a bypass conduit;
- a vision system; and
- a controller programmed to,
  - capture a baseline image of a front end of the vehicle via the vision system, wherein the baseline image includes an appearance of vehicle light captured under a contextual condition reflecting a weather condition in an absence of a coolant leak,
  - sample, via the vision system, first images at a first sampling rate for comparison to the baseline image,
  - responsive to detecting a difference between one or more of the first images and the baseline image exceeding a threshold, sample, via the vision system, second images at a second sampling rate greater than the first sampling rate,
  - analyze the second images to detect an object including a heat or steam indicative of a coolant leak,
  - transmit the second images to a remote operator,
  - transmit a historical image indicative of a coolant leak to the remote operator, and
  - activate the bypass valve to route coolant through the bypass conduit to prevent coolant circulation through the radiator in response to the image data indicative of a coolant leak at the radiator.

15. The vehicle of claim 14 wherein the controller is further programmed to receive route instructions from the remote operator to direct the vehicle to a service destination.

16. The vehicle of claim 14 wherein the refrigerant system is configured to circulate refrigerant through the chiller, and the controller is further programmed to monitor coolant loop thermal variation and cause an increase in refrigerant circulation through the chiller in response to the coolant loop thermal variation exceeding a threshold.

* * * * *